US011423517B2

(12) United States Patent
Moloney

(10) Patent No.: US 11,423,517 B2
(45) Date of Patent: *Aug. 23, 2022

(54) METHODS AND APPARATUS TO GENERATE MASKED IMAGES BASED ON SELECTIVE PRIVACY AND/OR LOCATION TRACKING

(71) Applicant: Movidius LTD., Schiphol-Rijk (NL)

(72) Inventor: David Moloney, Dublin (IE)

(73) Assignee: Movidius Ltd., Schiphol-Rijk (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/133,217

(22) Filed: Dec. 23, 2020

(65) Prior Publication Data
US 2021/0118103 A1 Apr. 22, 2021

Related U.S. Application Data

(63) Continuation of application No. 16/139,871, filed on Sep. 24, 2018, now Pat. No. 10,915,995.

(51) Int. Cl.
*G06T 5/00* (2006.01)
*G06F 21/84* (2013.01)
(Continued)

(52) U.S. Cl.
CPC .............. *G06T 5/004* (2013.01); *G06F 21/84* (2013.01); *G06N 5/00* (2013.01); *G06T 5/002* (2013.01);
(Continued)

(58) Field of Classification Search
CPC ........ G06T 5/004; G06T 5/002; H04W 4/023; G06F 21/84; G06K 9/00228;
(Continued)

(56) References Cited

U.S. PATENT DOCUMENTS 8,345,921 B1 1/2013 Frome et al.
8,508,520 B2 8/2013 Porwal
(Continued)

FOREIGN PATENT DOCUMENTS

CN 107145833 9/2017
CN 107169402 9/2017
(Continued)

OTHER PUBLICATIONS

United States Patent and Trademark Office, "Non-Final Office Action," dated Apr. 15, 2020 in connection with U.S. Appl. No. 16/139,871, 16 pages.
(Continued)

*Primary Examiner* — Dominic E Rego
(74) *Attorney, Agent, or Firm* — Hanley, Flight & Zimmerman, LLC

(57) ABSTRACT

An example stationary tracker includes: memory to store fixed geographic location information indicative of a fixed geographic location of the stationary tracker, and to store a reference feature image; and at least one processor to: determine a feature in an image is a non-displayable feature by comparing the feature to the reference feature image; and generate a masked image, the masked image to mask the non-displayable feature based on the non-displayable feature not allowed to be displayed when captured from the fixed geographic location of the stationary tracker, and the masked image to display a displayable feature in the image.

37 Claims, 7 Drawing Sheets

(51) Int. Cl.
*G06K 9/32* (2006.01)
*G06K 9/46* (2006.01)
*G06N 5/00* (2006.01)
*H04W 4/02* (2018.01)
*G06V 10/40* (2022.01)
*G06V 10/20* (2022.01)
*G06V 20/58* (2022.01)
*G06V 40/16* (2022.01)

(52) U.S. Cl.
CPC ............ *G06V 10/255* (2022.01); *G06V 10/40* (2022.01); *G06V 20/584* (2022.01); *G06V 40/161* (2022.01); *H04W 4/023* (2013.01)

(58) Field of Classification Search
CPC .... G06K 9/00825; G06K 9/3241; G06K 9/46; G06N 5/00
See application file for complete search history.

(56) References Cited

U.S. PATENT DOCUMENTS

| | | | |
|---|---|---|---|
| 9,471,840 B2 | 10/2016 | Govil et al. | |
| 9,802,599 B2 | 10/2017 | Abou-Nasr et al. | |
| 9,805,739 B2 | 10/2017 | Nongpiur et al. | |
| 9,934,781 B2 | 4/2018 | Subhojit et al. | |
| 10,205,913 B2 | 2/2019 | Smith et al. | |
| 10,225,511 B1 | 3/2019 | Lim et al. | |
| 10,354,133 B2 | 7/2019 | Chen et al. | |
| 10,574,890 B2 | 2/2020 | Moloney et al. | |
| 10,915,995 B2 | 2/2021 | Moloney | |
| 2003/0214592 A1* | 11/2003 | Ikeyama | H04N 5/2351 348/251 |
| 2008/0049020 A1* | 2/2008 | Gusler | G06F 3/012 345/427 |
| 2008/0084473 A1* | 4/2008 | Romanowich | G08B 13/19671 348/E7.086 |
| 2009/0101709 A1* | 4/2009 | Nonaka | G07C 9/28 235/382 |
| 2009/0262987 A1 | 10/2009 | Ioffe et al. | |
| 2010/0082244 A1* | 4/2010 | Yamaguchi | G08G 1/167 701/532 |
| 2011/0245942 A1* | 10/2011 | Yamamoto | A63F 13/5258 700/91 |
| 2011/0256886 A1* | 10/2011 | Velusamy | G01S 19/24 455/456.1 |
| 2012/0177288 A1* | 7/2012 | Chaussat | G06T 11/001 382/165 |
| 2012/0280783 A1* | 11/2012 | Gerhardt | H04W 12/08 340/5.6 |
| 2013/0300760 A1* | 11/2013 | Sugano | G06T 11/60 345/592 |
| 2014/0078172 A1* | 3/2014 | Systrom | G06F 3/04845 345/629 |
| 2014/0118545 A1* | 5/2014 | Iwasaki | H04N 5/23299 348/143 |
| 2014/0118553 A1* | 5/2014 | Diba | G08G 1/097 348/149 |
| 2014/0185953 A1* | 7/2014 | Hsieh | G06T 5/003 382/263 |
| 2014/0222985 A1* | 8/2014 | Chen | H04L 67/10 709/223 |
| 2014/0241585 A1* | 8/2014 | Zafiroglu | G06K 9/00791 382/104 |
| 2014/0258526 A1* | 9/2014 | Le Sant | G05B 15/02 709/224 |
| 2014/0316633 A1* | 10/2014 | Tsujimoto | G05D 1/0261 701/23 |
| 2014/0334684 A1* | 11/2014 | Strimling | G06K 9/3258 382/105 |
| 2014/0368626 A1 | 12/2014 | John Archibald et al. | |
| 2015/0009527 A1* | 1/2015 | Mochizuki | G06K 15/1806 358/1.15 |
| 2015/0138225 A1* | 5/2015 | Minato | G06T 11/60 345/593 |
| 2015/0172539 A1 | 6/2015 | Neglur | |
| 2015/0186743 A1* | 7/2015 | Karnos | G06V 10/751 382/195 |
| 2015/0242405 A1* | 8/2015 | Hostyn | G06F 16/7328 707/734 |
| 2015/0324686 A1 | 11/2015 | Julian et al. | |
| 2015/0339519 A1* | 11/2015 | Ueta | G06T 11/60 382/103 |
| 2015/0378658 A1* | 12/2015 | Mandigo | H04L 67/141 358/1.15 |
| 2016/0034809 A1 | 2/2016 | Trenholm et al. | |
| 2016/0037110 A1 | 2/2016 | Choi et al. | |
| 2016/0042668 A1* | 2/2016 | Sorensen | G09B 23/188 434/224 |
| 2017/0161579 A1 | 6/2017 | Gousev et al. | |
| 2017/0180632 A1* | 6/2017 | Yang | H04N 5/23216 |
| 2017/0272660 A1* | 9/2017 | Ishihara | G06T 3/0012 |
| 2017/0329903 A1* | 11/2017 | Shu | G06F 16/51 |
| 2017/0345615 A1* | 11/2017 | Zotta | H01J 37/02 |
| 2017/0351940 A1* | 12/2017 | Mazzarella | G08B 13/19641 |
| 2017/0353699 A1 | 12/2017 | Wang | |
| 2018/0196587 A1 | 7/2018 | Bialynicka-Birula et al. | |
| 2018/0232580 A1 | 8/2018 | Wolf | |
| 2018/0374105 A1 | 12/2018 | Azout et al. | |
| 2019/0042937 A1 | 2/2019 | Sheller et al. | |
| 2019/0064575 A1 | 2/2019 | Yang et al. | |
| 2019/0089910 A1* | 3/2019 | Ban | H04N 5/232933 |
| 2019/0114693 A1* | 4/2019 | Zhang | G06Q 30/0641 |
| 2019/0279082 A1 | 9/2019 | Moloney et al. | |
| 2019/0310611 A1* | 10/2019 | Jain | G01F 13/005 |
| 2020/0059587 A1* | 2/2020 | Pribble | H04N 5/2351 |
| 2020/0396383 A1 | 12/2020 | Moloney et al. | |
| 2022/0174215 A1 | 6/2022 | Moloney et al. | |

FOREIGN PATENT DOCUMENTS

| | | |
|---|---|---|
| CN | 107480611 | 12/2017 |
| WO | 2017031716 | 3/2017 |
| WO | 2018033890 | 2/2018 |
| WO | 2019137967 | 7/2019 |
| WO | 2019170785 | 9/2019 |
| WO | 2020064326 | 4/2020 |

OTHER PUBLICATIONS

United States Patent and Trademark Office, "Notice of Allowance," dated Sep. 23, 2020 in connection with U.S. Appl. No. 16/139,871, 7 pages.

Phong, Le Trieu, "Privacy-Preserving Stochastic Gradient Descent with Multiple Distributed Trainers," International Conference on Computer Analysis of Images and Patterns (CAIP), 2017, pp. 510-518, 9 pages.

McMahan et al., "Communication-Efficient Learning of Deep Networks from Decentralized Data," Feb. 28, 2017, pp. 1-11. Retrieved from the Internet on Jan. 7, 2019 [https://arxiv.org/pdf/w602.05629.pdf], 11 pages.

Chen et al., "Adaptive Silouette Extraction and Human Tracking in Complex and Dynamic Environments," IEEE International Conference on Image Processing, Atlanta, GA, Oct. 8-11, 2006, 4 pages.

Dehghani et al., "EoT Device with Factor Form Board," Nov. 15, 2016, 57 pages. Retrieved from the Internet on Oct. 3, 2019 at [URL: http://eyesofthings.eu/wp-content/uploads/deliverables/EoT_D2.6.pdf].

Li et al., "Automatic Musical Pattern Feature Extraction Using Convolutional Neural Network," Proceedings of the International MultiConference of Engineers and Computer Scientists, 2010 vol. I, IMECS 2010, Mar. 17-19, 2010, Hong Kong, 5 pages. Retrieved from the Internet on Oct. 3, 2019 at [URL: http://citeseerx.ist.psu.edu/viewdoc/download?doi=10.1.1.302.7795&rep=rep1&type=pdf].

Ogmen et al., "Neural Network Architectures for Motion Perception and Elementary Motion Detection in the Fly Visual System," Neural Networks, vol. 3, pp. 487-505, 1990, 19 pages.

(56) References Cited

OTHER PUBLICATIONS

Maturana et al., "VoxNet: A 3D Convolutional Neural Network for Real-Time Object Recognition," 2015 IEEE/RSJ International Conference on Intelligent Robots and Systems (IROS), Congress Center Hamburg, Sep. 28-Oct. 2, Hamburg, Germany, 7 pages.

International Searching Authority, "International Search Report," dated Jan. 8, 2020 in connection with International Patent Application No. PCT/EP2019/074126, 3 pages.

International Searching Authority, "Written Opinion," dated Jan. 8, 2020 in connection with International Patent Application No. PCT/EP2019/074126, 9 pages.

Felenasoft, "Face Blur in Xeoma Video Surveillance," Nov. 17, 2016, retrieved from [https://felenasoft.com/xeoma/en/articles/face-blur/] on Dec. 31, 2021, 4 pages.

\* cited by examiner

METHODS AND APPARATUS TO GENERATE MASKED IMAGES BASED ON SELECTIVE PRIVACY AND/OR LOCATION TRACKING

RELATED APPLICATION

This patent arises from a continuation of U.S. patent application Ser. No. 16/139,871, filed on Sep. 24, 2018, entitled "METHODS AND APPARATUS TO GENERATE MASKED IMAGES BASED ON SELECTIVE PRIVACY AND/OR LOCATION TRACKING." U.S. patent application Ser. No. 16/139,871 is incorporated herein by reference in its entirety. Priority to U.S. patent application Ser. No. 16/139,871 is claimed.

FIELD OF THE INVENTION

This disclosure is generally related to image processing, and more specifically to generating masked images based on selective privacy and/or location tracking.

BACKGROUND

Assets are often tracked to identify their locations at different times and to assess their progress between the different locations. For example, parcels shipped via courier can be provided with a shipping label bearing a barcode that can be scanned at different points along its shipping route. In this manner, a parcel's location can be updated in a database accessible by users to identify the en route status of the parcel.

BRIEF DESCRIPTION OF THE DRAWINGS

The figures are not to scale. Instead, for purposes of clarity, different illustrated aspects may be enlarged in the drawings. Wherever possible, the same reference numbers will be used throughout the drawings and accompanying written description to refer to the same or like parts.

DETAILED DESCRIPTION

Figure 1:
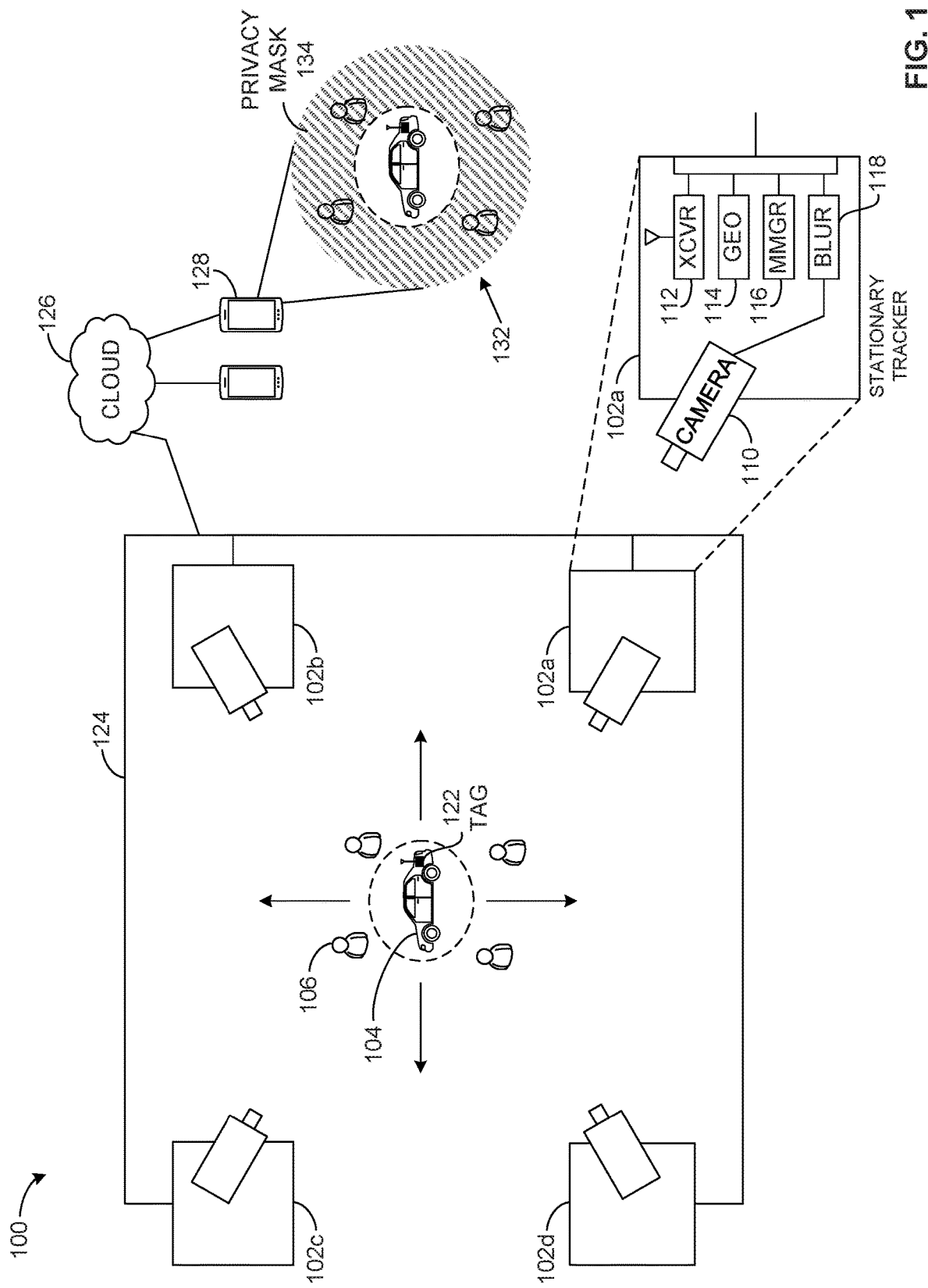
FIG. 1 illustrates an example visual tracking network of stationary trackers to generate masked images of tag bearers based on selective privacy and/or to track locations of the tag bearers.

Examples disclosed herein generate masked images based on selective privacy and/or to track locations of tag bearers. As used herein, a tag bearer is defined to be any person, object, and/or vehicle that carries or wears a tag having a tag identifier (ID) that can be scanned via wireless communications. Such wireless communications may be radio frequency (RF) communications (e.g., ultra-wideband (UWB) wireless communications, RF identifier (RFID) communications, Bluetooth® wireless communications, Zigbee® wireless communications, Wi-Fi wireless communications, cellular network communications, etc.), optical communications (e.g., image sensors, infrared, etc.), etc. In examples disclosed herein, a tag may be implemented using any form factor suitable for being borne by a tracked tag bearer. For example, a tag may be implemented as an adhesive label that can be located on a person, object, and/or vehicle. Additionally or alternatively, a tag may be implemented as a card having substantially similar dimensions to a credit card, a government issued ID card, a business issued ID card, an employment ID card, etc. such that the card can be carried or worn by a person and/or located in an object and/or vehicle to be tracked. In some examples, the tag may be implemented as a biochip that can be implanted in a human being. In this manner example biochips may be used in accordance with the teachings of this disclosure to track the whereabouts of persons requiring precautionary monitoring (e.g., a person with dementia, etc.). In some examples, biochips may be implanted in animals such as pets, zoo animals, and/or wild animals.

Examples disclosed herein may monitor the visible status and locations of tag bearers by capturing images and/or video of the tag bearers at different points in time and/or determining the geographic locations of the tag bearers at those different times. Examples disclosed herein may provide users with access to such visible status and location information based on subscription models in which users register to access such information. Such subscription-based services may be features of larger services such as courier services in which a customer (e.g., a shipper and/or receiver) is provided with access to visual status and/or location information of their en route goods or parcel(s) as part of a shipping agreement. Additionally or alternatively, such subscription-based services may be standalone services in which people register to access visual status and/or location information of tag bearers under a fee arrangement or some other agreement (e.g., an ad-driven service, an insurance-subsidized service, a government subsidized service, etc.).

Examples disclosed herein use stationary trackers to enable tracking tag bearers in fine-granular detail and in locations that would otherwise not allow such tracking. For example, stationary trackers disclosed herein are capable of providing geographic information of tag bearers even in urban canyons in which global positioning system (GPS) information is inaccessible due to buildings or other obstructions that attenuate signals from GPS satellites. Example stationary trackers disclosed herein are also capable of providing privacy-protecting visual confirmations of tag bearers in the form of masked visual captures (e.g., masked images and/or video) generated by the stationary trackers based on selective privacy masking to protect identities and privacies of persons, objects, and/or vehicles appearing in visual captures that are not the subject of tracking.

FIG. 1 illustrates an example visual tracking network 100 of stationary trackers 102a-d to generate masked images of tag bearers based on selective privacy and/or to track locations of the tag bearers. In the illustrated example, the visual tracking network 100 tracks visual confirmation and location of an example tag bearer 104. The tag bearer 104 of the illustrated example is a vehicle that is in the vicinity of multiple persons 106. In the illustrated example, the stationary trackers 102a-d are fixedly positioned at stationary locations and, as such, are associated with corresponding fixed geographic locations. For example, the stationary trackers 102a-d may be mounted on utility poles, buildings, sign posts, billboards, antenna towers, etc. In some examples, the stationary trackers 102a-d are substantially similar or identical to one another. Thus, the following detailed description of a first stationary tracker 102a may apply to any or all of the other trackers.

A detailed view of the example stationary trackers 102a is illustrated in FIG. 1. As shown, the example stationary trackers 102a is provided with an example camera 110, an example wireless transceiver 112 (e.g., an ultra-wideband (UWB) wireless transceiver, an RF identifier (RFID) transceiver, a Bluetooth® wireless transceiver, a Zigbee® wireless transceiver, a Wi-Fi wireless transceiver, a cellular communications transceiver, etc.), an example geographic location detector (GEO) 114, an example mask manager (MMGR) 116, and an example blur generator 118. In the illustrated example, the camera 110, the wireless transceiver 112, the mask manager 116, and the blur generator 118 are provided in a same housing to form the stationary tracker 102a at a time of manufacture. In some examples, the wireless transceiver 112, the mask manager 116, and the blur generator 118 may be implemented in a housing of the camera 110 at a time of manufacture. In some such examples, the components combined in the camera 110 form the stationary tracker 102a and are mounted in a housing of the camera 110. However, in other examples, the wireless transceiver 112, the mask manager 116, and the blur generator 118 may be provided after a time of manufacture as an after-market add-on. The after-market add-on may be the stationary tracker 102a without the camera 110 but capable of being communicatively coupled to the camera 110 by a customer. In this manner, the camera 110 may be purchased separately from the stationary tracker 102a and can be placed in communication with and/or connected to the stationary tracker 102a in an after-market assembly.

The example camera 110 of FIG. 1 captures images/video of tag bearers (e.g., the tag bearer 104). The example wireless transceiver 112 wirelessly communicates with a wireless tag 122 located on the tag bearer 104 to positively identify the tag bearer 104. For example, the wireless transceiver 112 may receive a unique identifier for the wireless tag 122 (e.g., in response to a request for the same). The example geographic location detector 114 provides geographic location coordinates as an approximate geographic location of the tag bearer 104. For example, the geographic location coordinates may be programmed or stored in a memory of the geographic location detector 114, or the geographic location detector 114 may be equipped with a GPS receiver and mounted at a location that receives GPS signals to generate and store geographic location coordinates either continuously or as part of a start-up routine.

In the illustrated example, the stationary trackers 102a-d are interconnected via a wired or wireless communication medium 124 and are in communication with a cloud service 126. For example, the stationary trackers 102a-d may be in communication with the cloud service 126 via a public network such as the Internet and/or via a private network. The stationary trackers 102a-d of the illustrated example implement eyes of things (EOT) devices that interoperate with an EOT platform with which computers (e.g., servers, client devices, appliances, etc.) across the Internet can communicate via application programming interfaces (APIs) to access visual captures of environments, persons, objects, vehicles, etc. For example, the cloud service 126 may implement such EOT platform to collect and/or provide access to the visual captures. In some examples, such visual captures may be the result of machine vision processing by the EOT devices and/or the EOT platform to extract, identify, modify, etc. features in the visual captures to make such visual captures more useful for generating information of interest regarding the subjects of the visual captures.

In the illustrated example of FIG. 1, the persons 106 in proximity of the tag bearer 104 appear in the field of view of the camera 110. As such, visual captures provided by the camera 110 include the tag bearer 104 and the persons 106. However, the persons 106 of the illustrated example have not consented to their tracking or are otherwise not the subject of tracking by the stationary trackers 102a-d. To protect the identities and privacies of the persons 106 within the field of view of the camera 110 while providing tracking information for the tag bearer 104, the example stationary tracker 102a includes the mask manager 116 and the blur generator 118. The example mask manager 116 controls masking of visual captures by the example blur generator 118. In this manner, the blur generator 118 can generate masked visual captures to mask features in visual captures by generating and/or locating privacy masks on the visual captures such that the privacy masks are to at least one of blur, obscure, obfuscate, conceal, or hide features not being tracked while maintaining viewability of tracked tag bearers. The example blur generator 118 generates the masked visual captures by altering and/or replacing pixels of visual captures at locations in the visual captures that include non-displayable features that are not to be viewable or discernable in the visual captures. For example, the blur generator 118 may generate a privacy mask that that replaces pixels of a visual capture with modified versions of those pixel color values such that the privacy mask creates a blurring effect at the non-displayable features. Additionally or alternatively, the blur generator 118 may generate a privacy mask that replaces pixels of a visual capture at the non-displayable features with pixels color values not based on the original pixel color values of the visual capture. In such examples, the privacy mask may appear as a solid color, a color pattern, and/or random colors overlaid onto the non-displayable features. Additionally or alternatively, the blur generator 118 may generate a privacy mask that outlines the non-displayable features (e.g., using edge detection or blur mask dimensions) in the visual capture, and the blur generator 118 crops out the outlined features from the visual capture based on the privacy mask. In examples disclosed herein, masked visual captures are referred to as masked images. Such masked images can be based on still image captures output by cameras or can be based on frames of motion video captures output by cameras.

In the illustrated example of FIG. 1, as the camera 110 captures images or video (e.g., surveillance video), local processing in the mask manager 116 and the blur generator 118 generates a privacy mask to mask or blur the persons 106 in the field of view of the camera 110 as non-displayable features (e.g., based on analyzing faces to confirm the persons 106 are non-displayable). This creates a movable opt-in transparency bubble in which the tracked tag bearer 104 is opted into being displayable in resulting masked images. In the illustrated example, instead of outputting a raw, unprocessed visual capture that shows the persons 106 and the tag bearer 104, the stationary tracker 102a provides the transparency bubble details (e.g., masked images, location information, timestamp information, etc.) to the cloud service 126. The client device 128 can then access an example masked image 132 that shows the tag bearer 104 in viewable/displayable form but conceals the persons 106 as non-displayable via an example privacy mask 134 generated by the blur generator 118. The example privacy mask 134 masks non-displayable features using any suitable masking effect including blurring, solid color overlay, color pattern overly, random color overlay, cropping out the non-displayable features, etc. Thus, the blur generator 118 is not limited to blurring non-displayable features. Instead, the blur generator 118 may generate any type of masking effect for the privacy mask 134.

In examples disclosed herein, by generating the masked image 132 by the blur generator 118 in the stationary tracker 102a before sending a visual capture of the tag bearer 104 to the cloud service 126, identities or privacies of non-displayable features (e.g., the persons 106) are protected during transmission of the visual capture of the tag bearer 104. As such, even if the masked image 132 is intercepted by a third-party during transmission between the stationary tracker 102a and the cloud service 126, the images of the non-displayable features are not discernible or visible to the third-party from the masked image 132. In this manner, identities or other features subject to privacy concerns are not inadvertently exposed to other networked devices or computers connected to the Internet that may maliciously or inadvertently access the masked image 132 during transmission. Such privacy-protecting features of examples disclosed herein are useful to generate visual tracking systems that comply with government and/or industry regulations regarding privacy protections of personal information. An example of such a government regulation of which compliance can be facilitated using examples disclosed herein is the European Union (EU) General Data Protection Regulation (GDPR), which is designed to harmonize data privacy laws across Europe, to protect and empower all EU citizens regarding data privacy, and to reshape the way organizations across the EU region approach data privacy.

In addition, generating masked images such as the masked image 132 in the stationary tracker 102a instead of at the cloud service 126 offloads processing requirements from the cloud service 126. For example, processing requirements for machine vision analyses and privacy mask generating processes are distributed to multiple stationary trackers (e.g., the stationary trackers 102a-d) so that each stationary tracker can use its processing capabilities for machine vision analyses of visual captures and generate masked images so that the cloud service 126 need not be equipped with the significant additional CPU (central processing unit), GPU (graphic processing unit), and/or memory resources required to perform such machine vision analyses and privacy mask generating processes for a large number of visual captures received from a large number of networked cameras. In addition, machine vision analyses and privacy mask generating processes can be done faster when performed in parallel at distributed stationary trackers rather than performed in seriatim in a central location such as the cloud service 126.

Although the example of FIG. 1 is described with primary reference to the stationary tracker 102a, any or all of the example stationary trackers 102b-d can be implemented to operate in a substantially similar or identical manner to the stationary tracker 102a. Alternatively, in other examples, the stationary tracker 102a is a master device, and the stationary trackers 102b-d are slave devices. In some such approaches, the stationary tracker 102a processes visual captures from cameras in the stationary trackers 102b-d and communicates with the cloud service 126. In such examples, the stationary trackers 102b-d need not be provided with the wireless transceiver 112, the geographic location detector 114, the mask manager 116, and/or the blur generator 118. Instead, the stationary trackers 102b-d communicate with the stationary tracker 102a via wired interfaces, and the stationary tracker 102a is configured to handle operations corresponding to those components for the network of the stationary trackers 102a-d. In some examples, networks of stationary trackers substantially similar or identical to the stationary trackers 102a-d are distributed across a region at every street intersection or at select intersections (e.g., intersections that handle freight or courier traffic).

Figure 2:
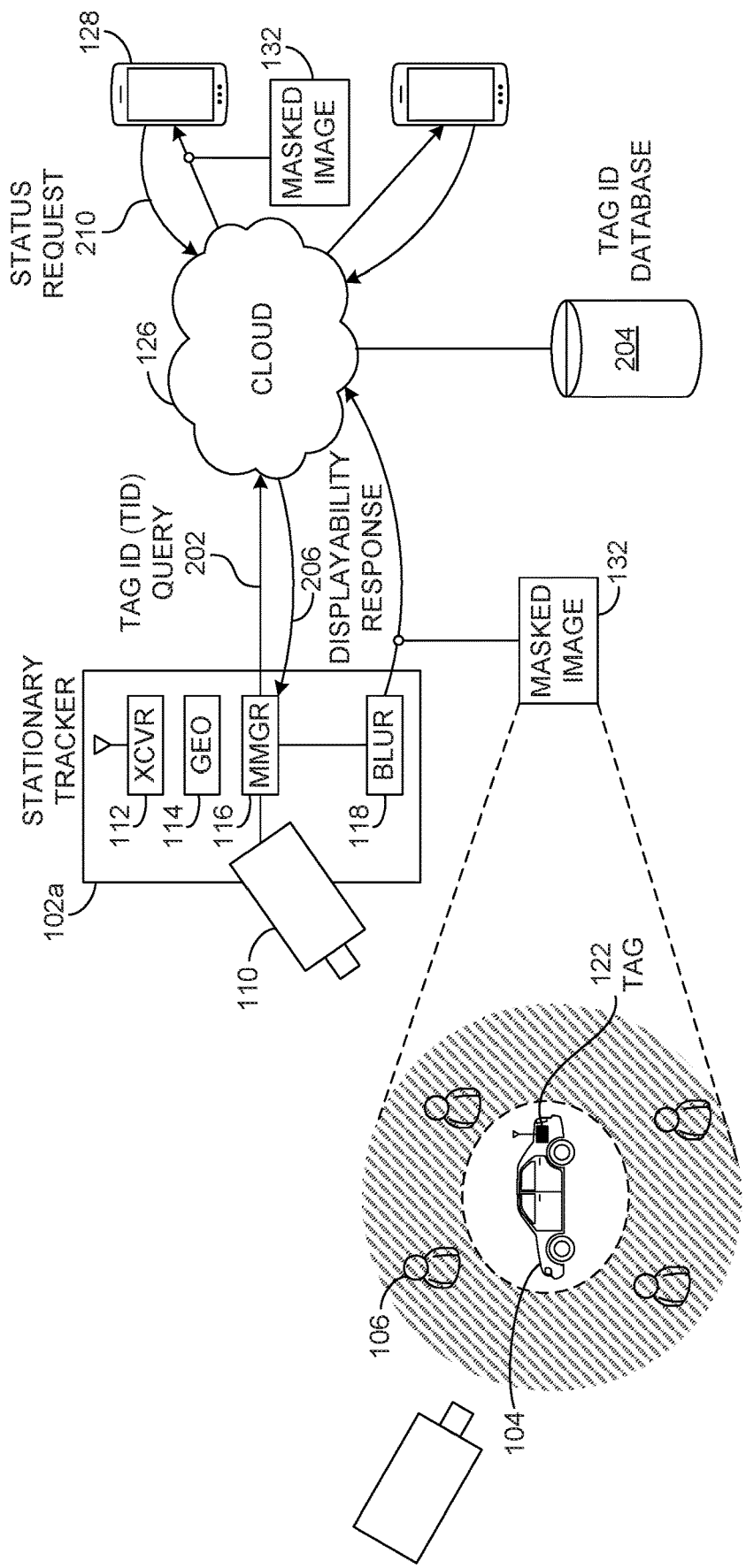
FIG. 2 is an example implementation of a stationary tracker of FIG. 1 in communication with an example cloud service of FIG. 1.

FIG. 2 illustrates an example implementation of the example stationary tracker 102a of FIG. 1 shown in communication with the cloud service 126 of FIG. 1. In operation, when the example wireless transceiver 112 confirms the presence of the tag bearer 104 in its vicinity (e.g., via periodic or aperiodic wireless probe messages), the stationary tracker 102a queries the cloud service 126 with a tag ID (TID) query 202 requesting confirmation that a tag ID of the tag 122 is registered for tracking. For example, the TID of the tag 122 can be registered for tracking in an example tag ID database 204 if a subscriber of the cloud service 126 has signed up to track the status of the tag bearer 104. The example tag ID database 204 stores multiple tag ID records that are associated with corresponding subscribers. The tag ID records include data fields identifying tag IDs for which visual captures of their tag bearers can be provided as displayable to subscribers. Based on the subscription status of the tag ID, the cloud service 126 returns a displayability response 206 to inform the stationary tracker 102a whether the tag ID is associated with a tag bearer that is to be tracked and is displayable for showing in a visual capture. If the tag ID of the tag 122 is registered for tracking, the stationary tracker 102a supplies visual captures of the tag bearer 104 to the cloud service 126. As described above in connection with FIG. 1, such visual captures may be in the form of masked images to protect identities and privacies of non-tracked features. In the illustrated example of FIG. 2, the blur generator 118 generates the masked image 132. The cloud service 126 can, in turn, serve the masked image 132 to the example client device 128 of a subscriber in response to the client device 128 submitting a tracking status request 210 to the cloud service 126.

Figure 3:
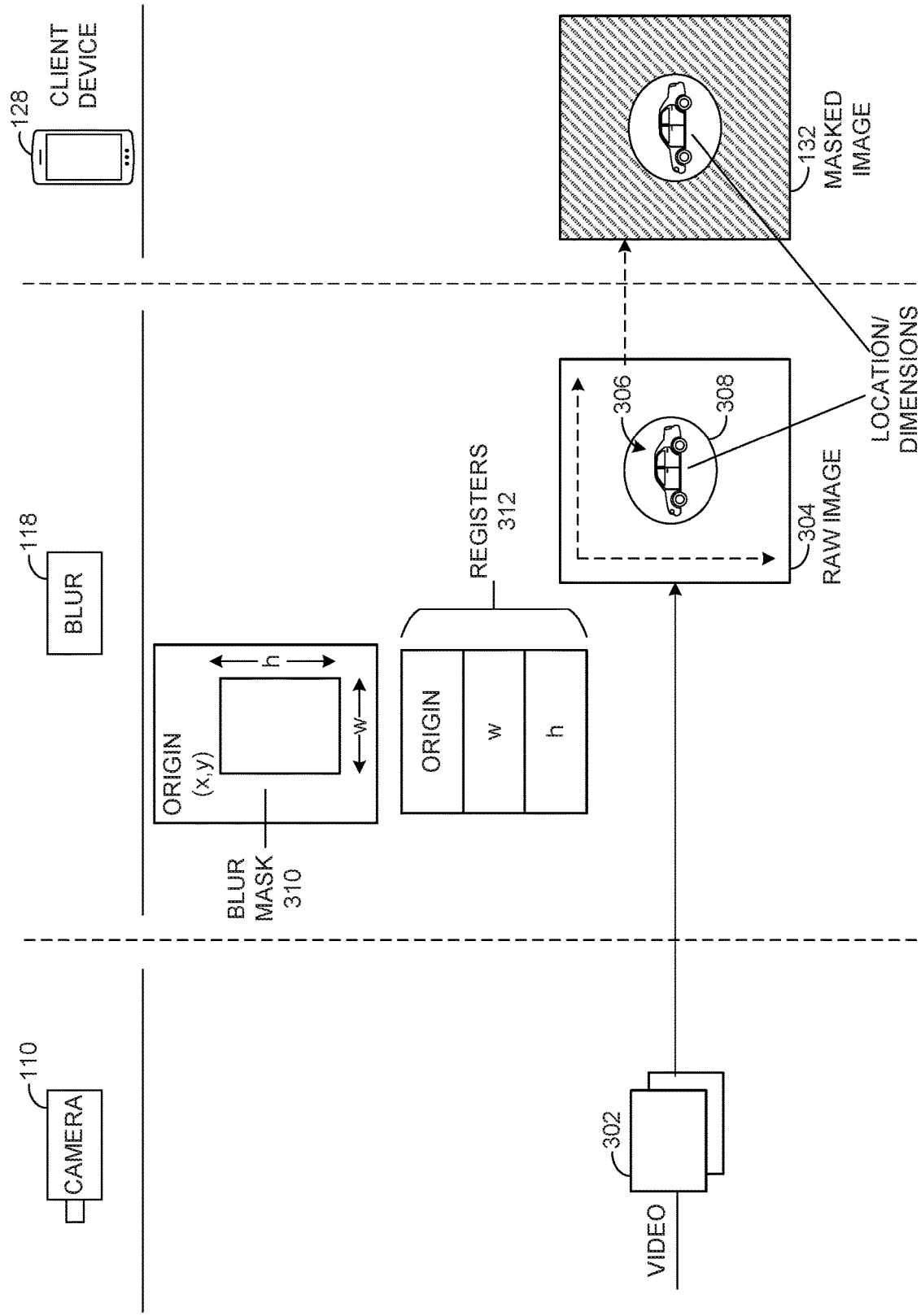
FIG. 3 illustrates an example sequence of operations based on intra-image pixel-location and pixel-dimension information that may be used by the stationary tracker of FIGS. 1 and 2 to generate masked images associated with tag bearers.

FIG. 3 illustrates an example sequence of operations based on intra-image pixel-location and pixel-dimension information that may be used by the stationary trackers of FIGS. 1 and 2 to generate masked images associated with tag bearers. In the illustrated example, the camera 110 provides a visual capture in the form of a surveillance video feed 302. The example surveillance video feed 302 is composed of a number of frames, each frame represents a corresponding image. In the illustrated example, the images of the surveillance video feed 302 are processed by the blur generator 118. For example, in FIG. 3, the blur generator 118 processes a raw image 304 that includes a displayable feature 306 representing the tag bearer 104 of FIGS. 1 and 2.

The displayable feature 306 is located in a non-masked area 308 having an intra-image pixel location and pixel dimensions within an x,y pixel grid (pixel location coordinates) of the raw image 304. In the illustrated example, location and dimension information of the non-masked area 308 are defined by a blur mask 310 that specifies an x,y origin (e.g., x,y pixel coordinates in an image representing a starting point of an outline of the non-masked area), a height (h), and a width (w) of the non-masked area 308. In the illustrated example, the x,y origin, the height (h), and the width (w) are stored in registers 312. In the illustrated example, the registers 312 are locations in memory (e.g., one or more of the local memory 813, the volatile memory 814, the nonvolatile memory 816, and or the mass storage 828). However, the registers 312 may additionally or alternatively be registers of a CPU (e.g., the processor 812 of FIG. 8) and/or a GPU.

In the illustrated example of FIG. 3, the blur generator 118 generates a mask based on the blur mask 310 defined in the registers 312 and applies the blur mask to the raw image 304 to generate the masked image 132. The stationary tracker 102a (FIGS. 1 and 2) can them provide the masked image 132 to the cloud service 126. The cloud service 126 can then serve the masked image 132 for viewing via the example client device 128 as described above in connection with FIGS. 1 and 2.

Although the blur mask 310 of FIG. 3 shows a rectangular shape for a non-masked area, non-masked areas may be implemented using any other suitable shape. For example, as shown in FIG. 3, the non-masked area 308 is implemented as a circular or oval region. The shape used for a non-masked area may be defined in the registers 312 in the form of a shape indicator. For example, width and height dimensions in the registers 312 define the width and height of the non-masked areas. A square or circle non-masked area can be defined by a width and height that are equal to one another. A rectangle or oval non-masked area can be defined by a width and height that differ from one another. In some examples, fewer or more dimensions than height and width may be provided in the registers 312 to define the dimensions of shapes used for non-masked areas. For example, to define a circular non-masked area, an x,y origin point specified in the registers 312 may define the center of the non-masked circular area and a single radius dimension may be provided in the registers 312 to define the size of the non-masked circular area. Additionally or alternatively, to define each side of a non-masked area shape having three or more sides, the dimension of each side may be stored in the registers 312.

Figure 4:
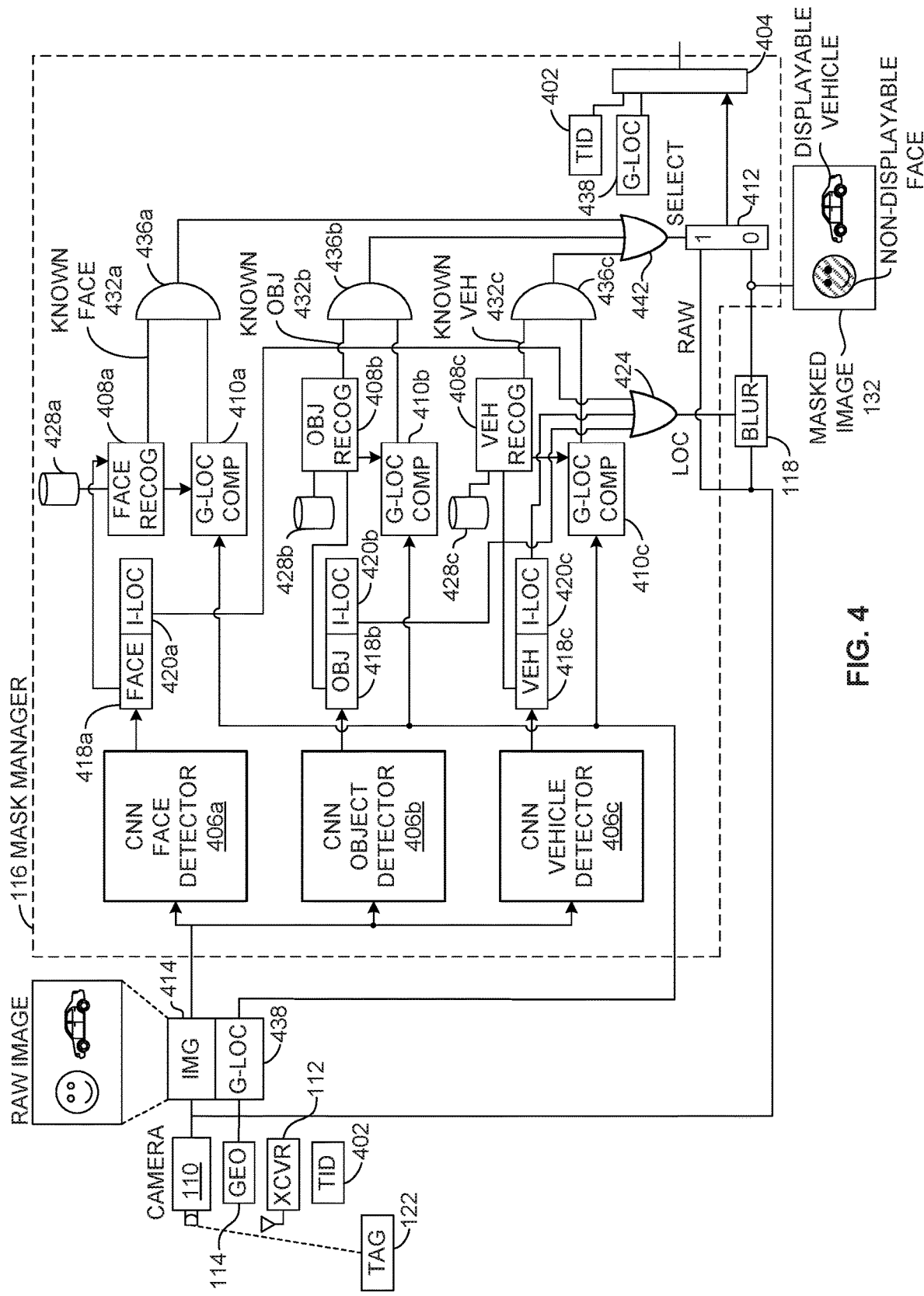
FIG. 4 is a block diagram of an example implementation of the mask manager of FIGS. 1 and 2 to generate masked images based on selective privacy and raw images from a single camera.

FIG. 4 illustrates an example implementation of the mask manager 116 of FIGS. 1 and 2. The example mask manager 116 is to generate masked images based on selective privacy and raw images from a single camera. In the illustrated example of FIG. 4, the mask manager 116 is in circuit with the camera 110, the wireless transceiver 112, the geographic location detector 114, and the blur generator 118. The wireless transceiver 112 detects a presence of the tag 122 and collects a tag ID (TID) 402 of the tag 122. The mask manager 116 of the illustrated example can provide the tag ID 402 to the cloud service 126 (FIGS. 1 and 2) via an example communications interface 404. In some examples, the mask manager 116 embeds the tag ID 402 in captured images or video of the tag bearer 104 corresponding to the tag 122. In this manner, the tag ID 402 is associated with or tied to the image of its corresponding tag bearer 104. The example communications interface 404 may be a wired communication interface (e.g., a local area network ethernet interface, a broadband network interface, etc.) or a wireless communication interface (e.g., a Wi-Fi wireless interface, a Bluetooth® wireless interface, a Zigbee® wireless interface, a cellular network interface, etc.). Based on a response (e.g., the displayability response 206 of FIG. 2) from the cloud service 126 regarding the displayability of the tag bearer corresponding to the tag 122 (e.g., the tag bearer 104 of FIGS. 1-3), the mask manager 116 can process visual captures from the camera 110 to generate corresponding privacy masks and masked images (e.g., the masked image 132 of FIGS. 1-3).

In the illustrated example of FIG. 4, the mask manager 116 includes a plurality of example convolutional neural network (CNN) feature detectors 406a, 406b, 406c, a plurality of example feature recognizers 408a, 408b, 408c, a plurality of example geographic location comparators 410a, 410b, 410c, and an example image output selector 412. The example CNN feature detectors 406a-c are in circuit with the camera 110 to receive or access visual captures 414 (e.g., videos/image) output by the camera 110. The example CNN feature detectors 406a-c are implemented using convolutional neural networks that can be trained to identify different features (e.g., persons, faces, objects, vehicles, etc.) in the visual captures 414 generated by the camera 110. For example, an example CNN face detector 406a is trained to identify faces in the visual captures 414 by using machine vision techniques to generate probabilities representative of likelihoods that different features in the visual captures 414 can be confirmed to be faces. In this manner, the example CNN face detector 406a can generate confirmations for features representing faces based on probabilities of those features satisfying a face probability threshold.

An example CNN object detector 406b is trained to identify objects in the visual captures 414 by using machine vision techniques to generate probabilities representative of likelihoods that different features in the visual captures 414 can be confirmed to be objects of interest. In this manner, the example CNN object detector 406b can generate confirmations for features representing objects of interest based on probabilities of those features satisfying an object probability threshold. Example objects of interest that can be confirmed by the CNN object detector 406b can be any type of object (e.g., parcels, packages, animals, materials, tools, products, foods, etc.). The objects of interest can be user defined or system defined. An example CNN vehicle detector 406c is trained to identify vehicles in the visual captures 414 by using machine vision techniques to generate probabilities representative of likelihoods that different features in the visual captures 414 can be confirmed to be vehicles of interest. In this manner, the example CNN object detector 406b can generate confirmations for features representing vehicles of interest based on probabilities of those features satisfying a vehicle probability threshold. Example vehicles of interest that can be confirmed by the CNN vehicle detector 406c can be any type of vehicle (e.g., cars, trucks, trains, semis, buses, tractors, airplanes, helicopters, boats, motorcycles, bicycles, etc.). The vehicles of interest may be user defined or system defined.

In the illustrated example, the CNN feature detectors 406a-c output detected feature confirmations 418a-c and corresponding image location and dimension information (I-LOC) 420a-c. For example, the CNN face detector 406a outputs detected face confirmations 418a, the CNN object detector 406*b* outputs detected object confirmations 418*b*, and the CNN vehicle detector 406*c* outputs detected vehicle confirmations 418*c*. The detected feature confirmations 418*a-c* include cropped out image portions of the visual captures 414 that include the features detected by the CNN feature detectors 406*a-c*. In this manner, the cropped-out image portions in the detected feature confirmations 418*a-c* can be analyzed by the feature recognizers 408*a-c* as described below to identify features that are allowed to be displayed via client devices (e.g., the client device 128 of FIGS. 1-3) and, on the other hand, to identify features present that must be masked.

In the illustrated example, the image location and dimension information 420*a-c* defines the x,y pixel location coordinates and pixel-based dimensions (e.g., as described above in connection with the registers 312 of FIG. 3) in the visual captures 414 for corresponding ones of the detected feature confirmations 418*a-c* output by the CNN feature detectors 406*a-c*. For example, a face I-LOC 420*a* defines the x,y pixel location coordinates and pixel-based dimensions of a face detected in a visual capture 414 as confirmed by a corresponding detected face confirmation 418*a*. An example object I-LOC 420*b* defines the x,y pixel location coordinates and pixel-based dimensions of an object detected in a visual capture 414 as confirmed by a corresponding detected object confirmation 418*b*. An example vehicle I-LOC 420*c* defines the x,y pixel location coordinates and pixel-based dimensions of a vehicle detected in a visual capture 414 as confirmed by a corresponding detected vehicle confirmation 418*c*.

In the illustrated example, the image location and dimension information (I-LOC) 420*a-c* determined by the CNN feature detectors 406*a-c* for detected features can be used to control the operation of the blur generator 118. For example, the blur generator 118 generates privacy masks in masked images (e.g., the masked image 132 of FIGS. 1-3) based on the image location and dimension information (I-LOC) 420*a-c* determined by the CNN feature detectors 406*a-c* to display displayable features while obscuring or masking non-displayable features based on the privacy masks. In the illustrated example, a logic-OR gate 424 is provided to mask or blur images of non-displayable features using the blur generator 118. The logic-OR gate 424 of the illustrated example is structured to receive image location and dimension information (I-LOC) 420*a-c* from multiple inputs and provide the image location and dimension information (I-LOC) 420*a-c* from one or more inputs to the blur generator 118. For example, the CNN feature detectors 406*a-c* output x,y pixel location coordinates and dimensions for image locations of detected features. In this manner, x,y pixel location coordinates and dimensions provided by the CNN feature detectors 406*a-c* are stored as the image location and dimension information (I-LOC) 420*a-c* indicate image location(s) of a feature or features that have been detected in an analyzed visual capture 414. In the illustrated example, the image location and dimension information (I-LOC) 420*a-c* from the CNN feature detectors 406*a-c* is provided to the logic-OR gate 424. When the logic-OR gate 424 receives x,y pixel location coordinates and dimensions in the image location and dimension information (I-LOC) 420*a-c*, the logic-OR gate 424 passes or provides the x,y pixel location coordinates and dimensions to the blur generator 118 to control the blur generator 118 to mask or blur corresponding portions of an input image. In this manner, if a masked or blurred image is selected by the image output selector 412, the blur generator 118 masks or blurs the detected non-displayable features based on their corresponding x,y pixel location coordinates and dimensions.

In some examples, the blur generator 118 can use the x,y pixel location coordinates and dimensions in the image location and dimension information (I-LOC) 420*a-c* to generate the blur mask 310 as described above in connection with FIG. 3. For example, the blur generator 118 can use the image location and dimension information (I-LOC) 420*a-c* of non-displayable features to determine location information and dimension information of displayable features to generate the blur mask 310 as described above in connection with FIG. 3. In this manner, the blur generator 118 can generate the masked image 132 to include masked or blurred features based on the image location and dimension information (I-LOC) 420*a-c* of non-displayable features and to include non-masked or non-blurred features based on location information and dimension information of displayable features.

Alternatively in other examples, the logic-OR gate 424 could be replaced with a sum of products circuit that is selectively enabled by a register to allow one or more combinations to be selected for blurring. Example blurring combinations include: (1) a face detected within a radius of the tag location AND a vehicle detected within a radius of the tag location that would blur the face of a driver in a delivery vehicle, (2) an object detected within a radius of the tag location AND a face detected within a radius of the tag location AND a vehicle detected within a radius of the tag location that would not blur the face of a person in a delivery vehicle holding an object that was being tracked, (3) and/or any other combination of feature(s) to be blurred and feature(s) not to be blurred.

In the illustrated example, the feature recognizers 408*a-c* access the detected feature confirmations 418*a-c* output by the CNN feature detectors 106*a-c*. The feature recognizers 408*a-c* of the illustrated example compare cropped out image portions in the detected feature confirmations 418*a-c* to reference feature images stored in corresponding reference feature databases 428*a-c* to identify features that are allowed to be displayed via client devices (e.g., the client device 128 of FIGS. 1-3) and to determine when features are present in the visual captures 414 that must be masked or blurred by the blur generator 118. The example reference feature databases 428*a-c* include a reference face database 428*a*, a reference object database 428*b*, and a reference vehicle database 428*c*. The example reference feature databases 428*a-c* are stored in a memory (e.g., one or more of the local memory 713, the volatile memory 714, the non-volatile memory 716, and or the mass storage 728) co-located with the mask manager 116 in, for example, the stationary tracker 102*a* of FIGS. 1 and 2. In the illustrated example, the reference features in the reference feature databases 428*a-c* are reference feature images downloaded from the cloud service 126 (FIGS. 1 and 2) and represent people, objects, and/or vehicles registered in the tag ID database 204 (FIG. 2) as tracking-enabled so that such features in visual captures 414 can be rendered viewable by the stationary tracker 102*a* for display via client devices (e.g., the client device 128 of FIGS. 1-3) of subscribers to the cloud service 126. Locally storing the reference feature databases 428*a-c* in the stationary tracker 102*a* increases the speed by which the mask manager 116 can process features detected by the CNN feature detectors 406*a-c*. However, in other examples, the reference feature databases 428*a-c* may not be stored locally in the stationary tracker 102*a*. In such examples, the feature recognizers 408*a-c* access the reference features via the cloud service 126 when analyzing features detected by the CNN feature detectors 406*a-c*.

In the illustrated example, the feature recognizers 408*a-c* output a known feature confirmation value 432*a-c* as a confirmed match value (e.g., a value of binary one) when a feature image in a detected feature confirmation 418*a-c* matches a reference feature image in a corresponding one of the reference feature databases 428*a-c*, and as a non-match value (e.g., a value of binary zero) when a feature image in a detected feature confirmation 418*a-c* does not match a reference feature image in a corresponding one of the reference feature databases 428*a-c*. In some examples, corresponding ones of the feature recognizers 408*a-c* (and/or corresponding ones of the CNN feature detector(s) 406*a-c*) can provide the image location and dimension information 420*a-c* (e.g., the origin, width, and height location and dimension information stored in the registers 312 as described above in connection with FIG. 3) for features recognized as displayable. In such examples, the example blur generator 118 uses the image location and dimension information 420*a-c* of displayable features to generate a privacy mask for the masked image 132 to display the displayable feature(s) while concealing or masking non-displayable feature(s) based on the privacy mask.

In the illustrated example, the mask manager 116 uses the known feature confirmation value 432*a-c* in connection with geo-fencing information and/or time-fencing information to determine when such detected known features are allowable for display based on their geographic locations. For example, the mask manager 116 is provided with logic-AND gates 436*a-c* that receive the known feature confirmation value 432*a-c* (e.g., a value of binary one) from the feature recognizers 408*a-c* and receive geographic location confirmations from the geographic location comparators 410*a-c*. In the illustrated example, the geographic location comparators 410*a-c* output a binary value of one as a geographic location confirmation value when a corresponding feature detected by the CNN feature detectors 406*a-c* is in a geographic location in which such feature is allowed to be displayed via a client device, and output a binary zero as a geographic location confirmation value when a corresponding feature detected by the CNN feature detectors 406*a-c* is in a geographic location in which such feature is not allowed to be displayed via a client device. As such, for a known feature detected by the feature recognizers 408*a-c* to be displayable, a binary value of one is provided by the feature recognizers 408*a-c* to confirm that it is a known feature, and a binary value of one is provided by the geographic location comparators 410*a-c* confirming that the known feature is in a geographic location in which it is displayable. In some examples, the geographic location comparators 410*a-c* also use timestamps of visual captures as criteria for determining whether features are allowed to be displayed via a client device. For example, the geographic location comparators 410*a-c* can obtain timestamps from the camera 110 and/or from the geographic location detector 114 indicative of when visual captures 414 are generated by the camera 110. The geographic location comparators 410*a-c* can the compare timestamps of the visual captures to reference times stored in the reference feature databases 428*a-c* for different reference features. In such examples, the reference times may be indicative of ranges of time during which features are displayable at particular geographic location(s) and/or at any geographic location. For example, displayability of some reference features may be restricted based on geographic location only, based on time only, and/or based on a combination of geographic location and time.

To determine whether features are allowed or not allowed to be displayed at particular geographic locations, the reference feature databases 428*a-c* store geographic locations in association with reference feature images. The example reference geographic locations represent geographic locations registered in association with corresponding features in the tag ID database 204 (FIG. 2) as geographic locations at which the corresponding features are tracking-enabled so that such features in visual captures 414 can be rendered viewable by the stationary tracker 102*a* for display via client devices (e.g., the client device 128 of FIGS. 1-3) of subscribers to the cloud service 126. In some examples in which features are allowed or not allowed to be displayed based on time, the reference feature databases 428*a-c* also store reference times specifying when features are displayable. The geographic location comparators 410*a-c* obtain the reference geographic locations (and/or reference times) via corresponding ones of the feature recognizers 408*a-c* whenever the feature recognizers 408*a-c* confirm recognition of a feature that is allowed to be displayed based on a reference feature image in a corresponding reference feature database 428*a-c*. In addition, the geographic location comparators 410*a-c* obtain geographic location coordinates 438 from the example geographic location detector 114. In the illustrated example, the geographic location coordinates 438 are programmed into the geographic location detector 114 or are derived by the geographic location detector 114 to specify the geographic location of the stationary tracker 102*a*. The geographic location coordinates 438 are representative of the approximate location of the tag bearer of the tag 122 (e.g. the tag bearer 104 of FIGS. 1-3). The geographic location comparators 410*a-c* may also obtain timestamps from the example geographic location detector 114 and/or from the camera 110 for corresponding visual captures 414.

The geographic location comparators 410*a-c* compare the geographic location coordinates 438 to reference geographic locations from the reference feature databases 428*a-c* and/or compare timestamps to reference timestamps. The geographic location comparators 410*a-c* output a geographic match confirmation value of one when geographic location coordinates 438 match a reference geographic location (and/or when a timestamp of a visual capture 414 matches a reference timestamp) to indicate that a corresponding feature at the geographic location coordinates 438 is allowed to be displayed via a client device. In addition, the geographic location comparators 410*a-c* output a geographic match confirmation value of zero when geographic location coordinates 438 do not match a reference geographic location (and/or when a timestamp of a visual capture 414 does not match a reference timestamp) to indicate that a corresponding feature at the geographic location coordinates 438 is not allowed to be displayed via a client device. In this manner, in addition to the mask manager 116 confirming that a feature can be displayed based on it matching a reference feature image in a reference feature database 428*a-c*, the mask manager 116 also confirms that a geographic location (and/or timestamp) of the feature allows the feature to be displayed based on geo-fencing (and/or time-fencing) criteria.

In the illustrated example, the known feature confirmation values 432*a-c* from the feature recognizers 408*a-c* and the geographic match confirmation values from the geographic location comparators 410*a-c* are provided to the logic-AND gates 436*a-c*. Also in the illustrated example, the outputs of the logic-AND gates 436*a-c* are provided to a logic-OR gate 442 to control whether to provide the cloud service 126 raw images of the visual captures 414 output by the camera 110 or masked images (e.g., the masked image 132) generated by the blur generator 118. That is, if a known feature (e.g., rather than an unknown feature) is detected by the feature recognizers 408a-c and the geographic location comparators 410a-c determines that the known feature is in a geographic location at which the known feature is displayable, the logic-OR gate 442 outputs a binary value of one for that known feature to allow a raw image to pass through the image output selector 412. Otherwise, the logic-OR gate 442 outputs a binary value of zero for a non-displayable feature (e.g., an unknown feature or a known feature that is not in a geographic location in which it is displayable) and a masked or blurred image for the non-displayable feature is selected for output by the image output selector 412. For example, if a feature (e.g., a face, an object, or a vehicle) detected by the CNN feature detectors 406a-c is determined by the feature recognizers 408a-c to be a known feature that is displayable (e.g., via the client device 128) based on matching feature reference images and is determined by the geographic location comparators 410a-c to be displayable (e.g., via the client device 128) based on its geographic location, then a mask by the blur generator 118 need not be applied to the known feature. In the illustrated example of FIG. 4, such detecting of a known feature that is displayable is implemented at each of the logic-AND gates 436a-c by providing a value of binary one to both inputs of that logic-AND gate 436a-c via a corresponding one of the known feature confirmation values 432a-c from the feature recognizers 408a-c and via a corresponding one of the geographic match confirmation values from the geographic location comparators 410a-c so that the corresponding logic-AND gate 436a-c outputs a logic binary one to the logic-OR gate 442. This results in the logic-OR gate 442 outputting a binary one to the image output selector 412 when a known feature detected by a feature recognizer 408a-c is in a geographic location at which a corresponding one of the geographic location comparators 410a-c determines the known feature is displayable. The example image output selector 412 of the illustrated example is implemented using a multiplexer such that a logic binary one input causes selection of a raw image for outputting or sending to the cloud service 126 via the communications interface 404. However, if a feature detected by one of the CNN feature detectors 406a-c is determined by the feature recognizers 408a-c and/or the geographic location comparators 410a-c as non-displayable (e.g., via the client device 128), then a mask by the blur generator 118 must be applied to the non-displayable feature(s). In such instances, a zero input to the logic-OR gate 442 from a logic-AND gate 436a-c is indicative that a corresponding feature is not displayable and causes the logic-OR gate 442 to output a zero value. A zero value from the logic-OR gate 442 causes the example image output selector 412 to select a masked image to be output or sent to the cloud service 126 via the communications interface 404.

Although the mask manager 116 is described in the illustrated example of FIG. 4 as having geo-fencing and/or time-fencing capabilities based on the geographic location comparators 410a-c, in other examples, the mask manager 116 may be implemented without such geo-fencing and/or time-fencing capabilities. In such examples, the mask manager 116 controls the blur generator 118 based on the feature recognizers 408a-c confirming features recognized as being allowable or not allowable for display without using comparison analyses of geographic locations by the geographic location comparators 410a-c.

Figure 5:
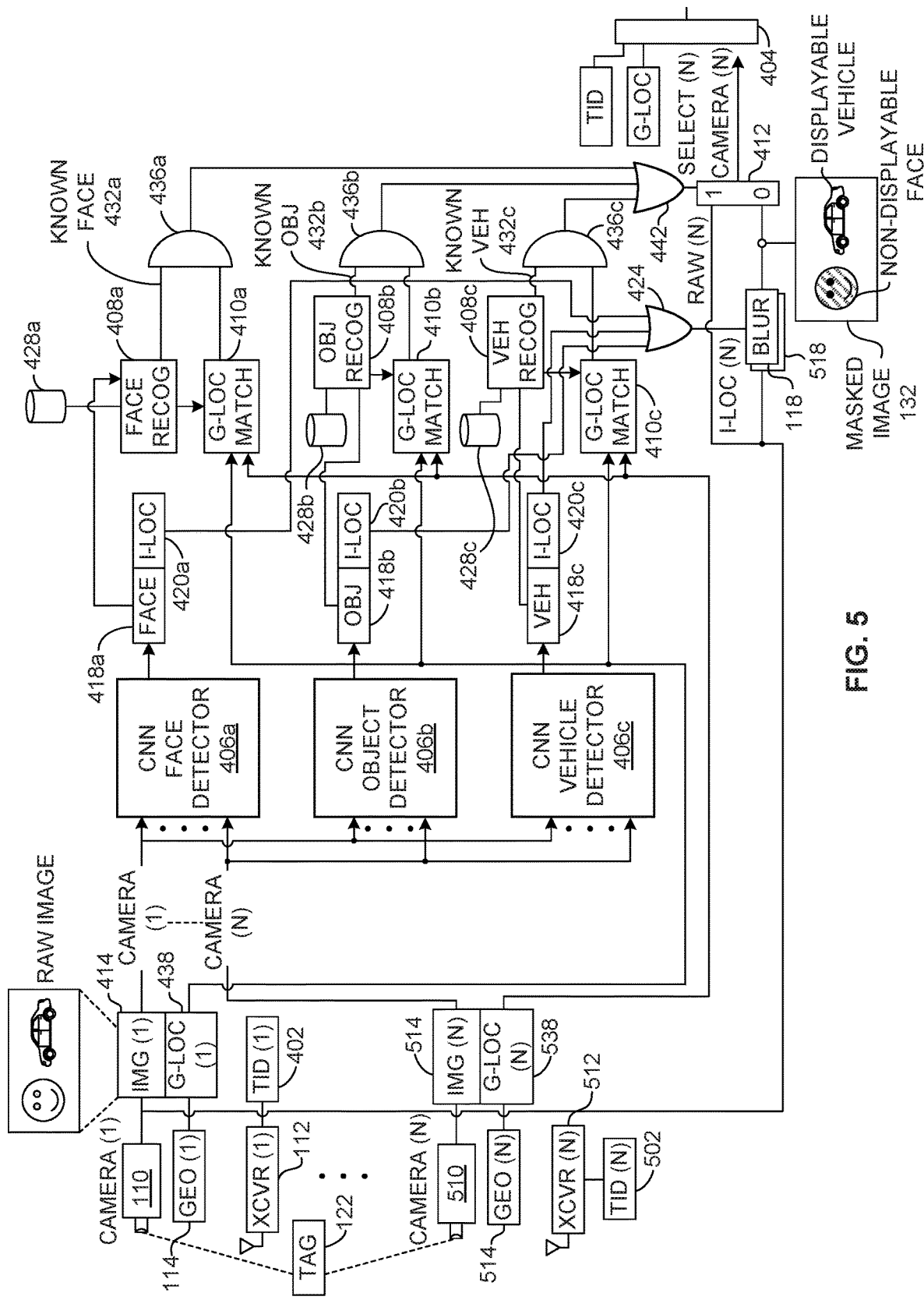
FIG. 5 is a block diagram of one or more mask managers to generate masked images based on selective privacy and raw images from multiple cameras.

FIG. 5 is an example block diagram of one or more mask managers 116 to generate masked images based on selective privacy and raw images from multiple cameras. For example, the block diagram of FIG. 5 is shown with multiple cameras (e.g., camera (1) 110 through camera (N) 510), multiple wireless transceivers (e.g., wireless transceiver (1) 112 through wireless transceiver (N) 512), and multiple geographic location detectors (e.g., geographic location detector (1) 114 through geographic location detector (N) 514). The example cameras (1) 110 through (N) 510 provide corresponding visual captures (1) 414 through (N) 514. The example wireless transceiver (1) 112 through (N) 512 provide tag IDs TID (1) 402 through (N) 502. The example geographic location detector (1) 114 through (N) 514 provide geographic location coordinates (1) 438 through (N) 538. The example blur generator (1) 118 through (N) 518 generate privacy masks and apply the privacy masks to corresponding ones of the visual captures (1) 414 through (N) 514 to generate masked images. The example of FIG. 5 may be implemented with any number of cameras (e.g., the cameras 110, 510), wireless transceivers (e.g., the wireless transceiver 112, 512), geographic location detectors (e.g., the geographic location detector 114, 514), and/or mask managers (e.g., the mask manager 116). In some examples, multiple cameras may be provided for one wireless transceiver, one geographic location detector, and one mask manager shared by all of the cameras. Such a configuration may be used for instances in which the multiple cameras are mounted proximate one another at a same general location to capture different views of a same area (e.g., mounted at respective corners of a street intersection). In other examples, each of multiple cameras can be provided with respective wireless transceivers, geographic location detectors, and mask managers. In yet other examples, any mix of respective and shared components can be provided (e.g., one mask manager 116 for multiple cameras, multiple wireless transceivers, and multiple geographic location detectors). The structure and operations of the example mask manager of FIG. 5 are substantially similar to the structure and operation of the mask manager 116 described above in connection with FIG. 4 and can be adapted in any suitable manner for use with multiple cameras, multiple wireless transceivers, multiple geographic location detectors, and/or multiple mask managers. As such, in the interest of brevity, a full detailed description of the components of the mask manager 116 as shown in FIG. 5 is not repeated below. Instead, the interested reader is referred to the above description of the corresponding structure provided in connection with FIG. 4.

While example manners of implementing the stationary trackers 102a-d and/or the mask manager 116 of FIGS. 1 and 2 to generate masked images (e.g., the masked image 132 of FIGS. 1-5) based on selective privacy and/or geographic locations of tag bearers (e.g., the tag bearer 104 of FIGS. 1-3) are illustrated in FIGS. 4 and 5, one or more of the elements, processes and/or devices illustrated in FIGS. 4 and 5 may be combined, divided, re-arranged, omitted, eliminated and/or implemented in any other way. Further, the example cameras 110, 510, the example wireless transceiver 112, 512, the example geographic location detector 114, 514, the example blur generator 118, 518, the example CNN feature detectors 406a-c, the example feature recognizers 408a-c, the example geographic location comparators 410a-c, the example image output selector 412, the example reference feature databases 428a-c, the example logic-OR gates 424, 442, the example logic-AND gates 436a-c and/or, more generally, the example stationary trackers 102a-d and/or the example mask manager 116 of FIGS. 1, 2, 4, and 5 may be implemented by hardware, software, firmware and/or any combination of hardware, software and/or firmware. Thus, for example, any of the example cameras 110, 510, the example wireless transceiver 112, 512, the example geographic location detector 114, 514, the example blur generator 118, 518, the example CNN feature detectors 406a-c, the example feature recognizers 408a-c, the example geographic location comparators 410a-c, the example image output selector 412, the example reference feature databases 428a-c, the example logic-OR gates 424, 442, the example logic-AND gates 436a-c and/or, more generally, the example stationary trackers 102a-d and/or the example mask manager 116 of FIGS. 1, 2, 4, and 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example cameras 110, 510, the example wireless transceiver 112, 512, the example geographic location detector 114, 514, the example blur generator 118, 518, the example CNN feature detectors 406a-c, the example feature recognizers 408a-c, the example geographic location comparators 410a-c, the example image output selector 412, the example reference feature databases 428a-c, the example logic-OR gates 424, 442, the example logic-AND gates 436a-c, and the example mask manager 116 is/are hereby expressly defined to include a non-transitory computer readable storage device or storage disk such as a memory, a digital versatile disk (DVD), a compact disk (CD), a Blu-ray disk, etc. including the software and/or firmware. Further still, the example stationary trackers 102a-d and/or the example mask manager 116 of FIGS. 1, 2, 4, and 5 may include one or more elements, processes and/or devices in addition to, or instead of, those illustrated in FIGS. 1, 2, 4, and 5 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, feature detecting means may be implemented by one or more of the example CNN feature detectors 406a-c, feature recognizing means may be implemented by one or more of the example feature recognizers 408a-c, mask generating means may be implemented by one or more of the blur generators 118, 518. Also in examples disclosed herein, image output selecting means may be implemented by the example image output selector 412, geographic locating means may be implemented by one or more of the example geographic location detectors 114, 514, and geographic location comparing means may be implemented by one or more of the example geographic location comparators 410a-c.

Figure 6:
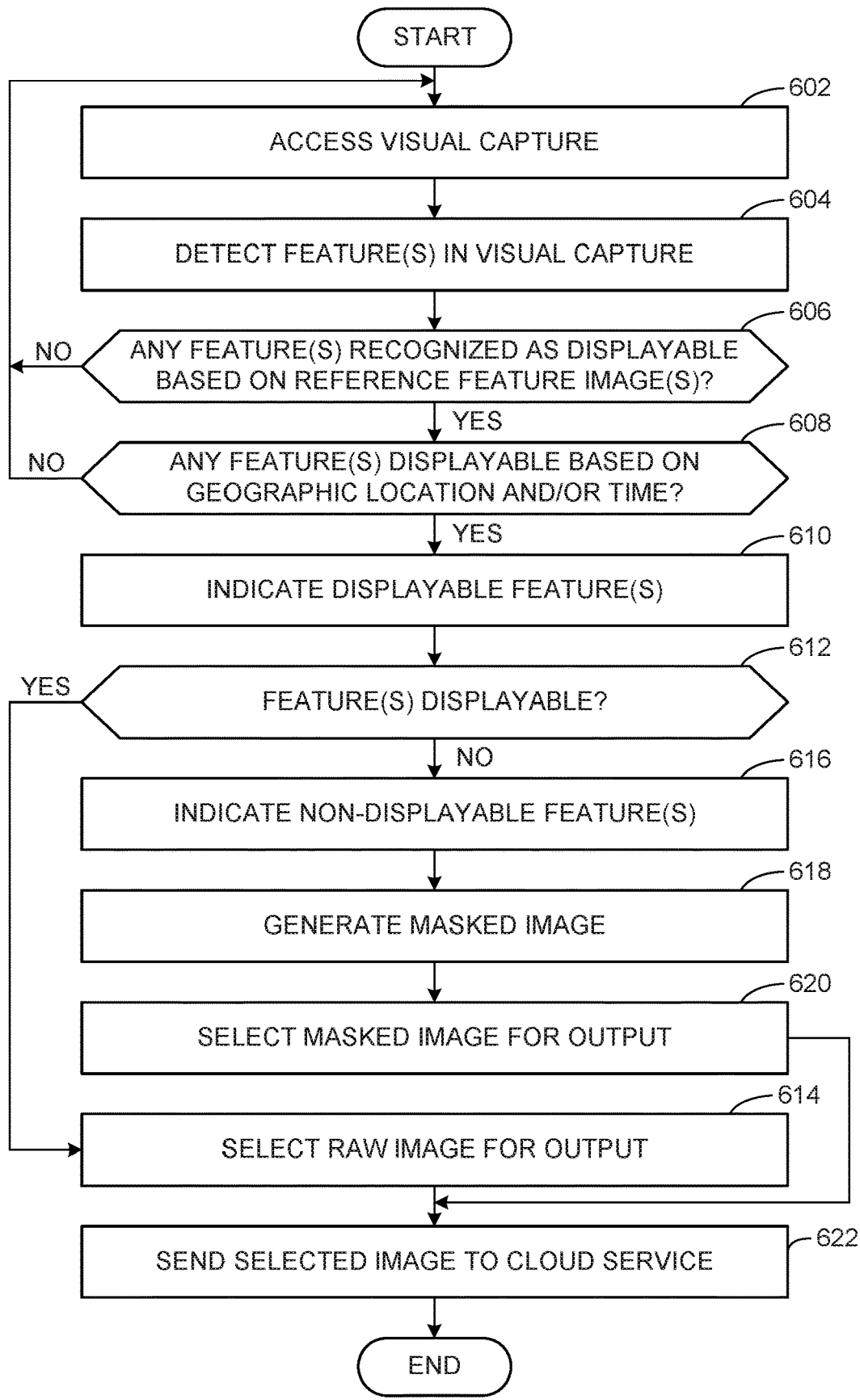
FIG. 6 is a flowchart representative of example machine-readable instructions that may be executed to implement the stationary trackers of FIGS. 1 and 2 and/or the mask manager of FIGS. 1-5 to generate masked images based on selective privacy, geographic locations, and/or times of observation of tag bearers.

FIG. 6 is a flowchart representative of machine-readable instructions that may be executed to implement the stationary trackers 102a-d of FIGS. 1 and 2 and/or the mask manager 116 of FIGS. 1, 4, and 5 to generate masked images (e.g., the masked image 132 of FIGS. 1-5) based on selective privacy, geographic locations, and/or times of observation of tag bearers (e.g., the tag bearer 104 of FIGS. 1-3). In this example, the machine-readable instructions implement a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example stationary trackers 102a-d and/or the example mask manager 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim lists anything following any form of "include" or "comprise" (e.g., comprises, includes, comprising, including, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example program of FIG. 6 begins at block 602 at which one or more CNN feature detector(s) access(es) a visual capture. For example, one or more of the CNN feature detector(s) 406a-c of FIG. 4 access a visual capture 414 (e.g., an image and/or video frame) output by the camera 102a as described above in connection with FIG. 4. The example CNN feature detector(s) 406a-c detect(s) one or more feature(s) in the visual capture 414 (block 604). For example, the CNN feature detector(s) 406a-c detect(s) one or more feature(s) in the visual capture 414 as described above. One or more feature recognizer(s) determine whether any one or more of the detected feature(s) are recognized as displayable based on reference feature image(s) (block 606). For example, one or more of the feature recognizer(s) 408a-c compare corresponding feature(s) from the CNN feature detector(s) 406a-c to reference feature images from corresponding ones of the reference feature database(s) 428a-c as described above in connection with FIG. 4 to determine whether any one or more of the detected feature(s) is displayable. In this manner, the feature recognizer(s) 408a-c can determine one or more first feature(s) that is/are displayable feature(s) and one or more second feature(s) that is/are non-displayable feature(s) based on comparing the first and second feature(s) in the visual capture 414 to reference features stored in the reference feature database(s) 428a-c. If the feature recognizer(s) 408a-c determine(s) at block 606 that none of the detected feature(s) is displayable, control returns to block 602 to process another visual capture 414. In such examples, neither a raw image nor a masked image is output by the stationary tracker 102a because none of the features in the visual capture can be displayed via, for example, the client device 128. In some examples, the example process of FIG. 6 may end if, for example, there is no further visual capture to process.

If the feature recognizer(s) 408a-c determine(s) at block 606 that one or more of the detected feature(s) is displayable, control advances to block 608 at which one or more geographic location comparator(s) determine(s) whether any one or more recognized feature(s) is displayable based on geographic location and/or time (block 608). For example, one or more of the geographic location comparator(s) 410a-c compares geographic location coordinates 438 (FIG. 4) (and/or a timestamp) corresponding to the recognized feature(s) to reference geographic location coordinates (and/or reference times) from the reference feature database(s) 428a-c to determine whether any one or more of the recognized feature(s) is displayable based on the geographic location (and/or the timestamp) of the recognized feature(s). If the geographic location comparator(s) 410a-c determine(s) that none of the recognized feature(s) is displayable based on geographic location (and/or the timestamp), control returns to block 602 to process another visual capture 414. In such examples, neither a raw image nor a masked image is output by the stationary tracker 102a because none of the features in the visual capture can be displayed via, for example, the client device 128. In some examples, the example process of FIG. 6 may end if, for example, there is no further visual capture to process.

If the geographic location comparator(s) 410a-c determine(s) at block 608 that one or more of the recognized feature(s) is displayable based on geographic location (and/or the timestamp), control advances to block 610 at which the mask manager 116 indicates one or more displayable feature(s). For example, the feature recognizer(s) 408a-c can output respective known feature confirmation value(s) 432a-c and the geographic location comparator(s) 410a-c can output respective geographic location confirmation value(s) to indicate one or more of the recognized feature(s) that are displayable via a client device (e.g., the client device 128 of FIGS. 1-3). In addition, corresponding ones of the CNN feature detector(s) 406a-c and/or corresponding ones of the feature recognizers 408a-c can provide the image location and dimension information (I-LOC) 420a-c (e.g., the origin, width, and height location and dimension information stored in the registers 312 as described above in connection with FIG. 3) for displayable and/or non-displayable feature(s) so that the blur generator 118 can generate the masked image 132 based on the image location and dimension information (I-LOC) 420a-c to display the displayable feature(s) while obscuring or concealing the non-displayable features.

At block 612, the mask manager 116 determines whether one or more feature(s) is displayable. For example, the logic-OR gate 442 (FIG. 4) determines whether a feature is displayable based on input values from a corresponding one of the logic-AND gates 436a-c (FIG. 4). If the mask manager 116 determines at block 612 that one or more feature(s) is displayable, control advances to block 614 at which the image output selector 412 (FIG. 4) selects a raw image, devoid of or without masking the displayable feature(s), as an output. For example, the image output selector 412 selects the visual capture 414 as a raw image for output without masking or blurring displayable feature(s) detected by the feature recognizer(s) 408a-c for the raw image before providing the raw image for display via the client device 128.

Alternatively, when the mask manager 116 determines at block 612 that one or more feature(s) is not displayable, control advances to block 616 at which the mask manager 116 indicates one or more non-displayable feature(s). For example, the feature recognizer(s) 408a-c can output respective known feature confirmation value(s) 432a-c and the geographic location comparator(s) 410a-c can output respective geographic location confirmation value(s) as zero binary value(s) to indicate one or more of the recognized feature(s) that are non-displayable to the client device 128. In some examples, the non-displayable feature(s) are non-displayable because they are not recognized by the feature recognizer(s) 408a-c as known features (e.g., the feature recognizer(s) 408a-c output known feature confirmation value(s) 432a-c as zero binary value(s)). The example blur generator 118 generates a masked image (block 618). For example, the blur generator 118 generates the masked image 132 (FIGS. 1-5) to display the displayable feature(s) and to mask the non-displayable feature(s) (e.g., based on corresponding image location and dimension information (I-LOC) 420a-c of displayable and/or non-displayable feature(s)). The image output selector 412 (FIG. 4) selects the masked image 132 as an output (block 620). For example, the image output selector 412 selects the masked image 132 when the feature recognizer(s) 408a-c detect(s) one or more non-displayable feature(s) corresponding to the visual capture 414 that must be masked or blurred before providing the visual capture 414 for display via the client device 128. After selecting an image at block 618 or at block 620, the communications interface 404 sends the selected image to the cloud service 126 (block 622). In some examples, the communications interface 404 also sends the geographic location information of the tag bearer 104 shown in the selected image and/or a timestamp indicative of the time and/or date the selected image was captured by the camera 110. In this manner, the cloud service 126 can provide visual confirmation, geographic location, and/or time/date information as status information of the tag bearer 104. The example process of FIG. 6 then ends.

Figure 7:
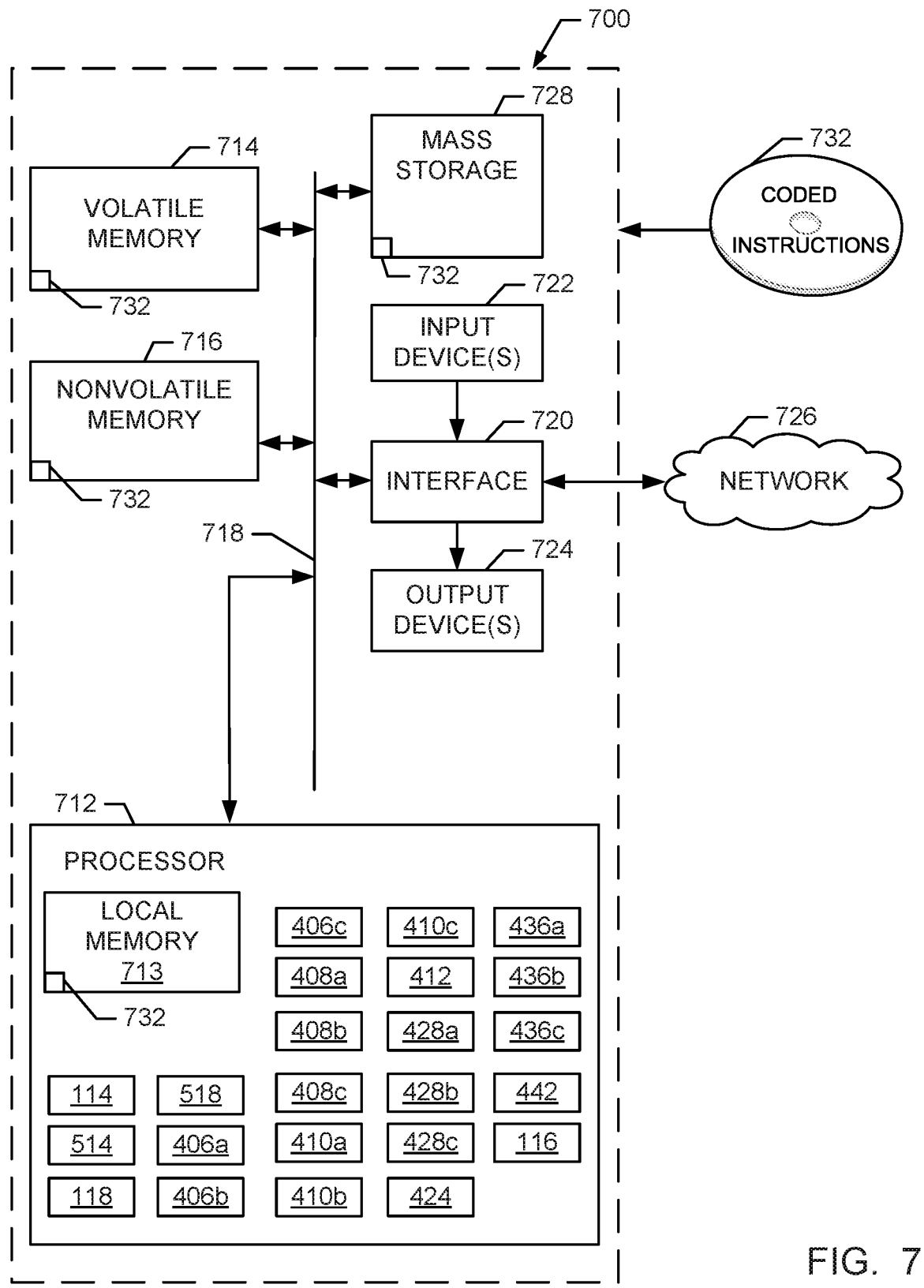
FIG. 7 is a processor platform structured to execute the machine-readable instructions of FIG. 6 to implement the stationary tracker of FIGS. 1 and 2 and/or the mask manager of FIGS. 1-5 to generate masked images based on selective privacy, geographic locations, and/or times of observation of tag bearers in accordance with the teachings of this disclosure.

FIG. 7 is a block diagram of an example processor platform 700 structured to execute the instructions of FIG. 6 to implement the stationary trackers 102a-d of FIGS. 1 and 2 and/or the mask manager 116 of FIGS. 1, 4, and 5 to generate masked images (e.g., the masked image 132 of FIGS. 1-5) based on selective privacy, geographic locations, and/or times of observation of tag bearers (e.g., the tag bearer 104 of FIGS. 1-3). The processor platform 700 can be, for example, a server, a personal computer, a mobile device (e.g., a cell phone, a smart phone, a tablet such as an iPad™), a personal digital assistant (PDA), an Internet appliance, a digital video recorder, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The hardware processor 712 may be a semiconductor based (e.g., silicon based) device. In this example, the processor 712 implements the example geographic location detector 114, 514, the example blur generator 118, 518, the example CNN feature detectors 406a-c, the example feature recognizers 408a-c, the example geographic location comparators 410a-c, the example image output selector 412, the example reference feature databases 428a-c, the example logic-OR gates 424, 442 the example logic-AND gates 436a-c, and the example mask manager 116.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface. In the illustrated example, the interface circuit 720 implements the wireless transceiver 112 of FIGS. 1, 2, 4, and 5 and/or the wireless transceiver 512 of FIG. 5.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example, the input devices 722 implement the camera 110 of FIGS. 1-5 and/or the camera 510 of FIG. 5.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 representative of the machine-readable instructions of FIG. 6 may be stored in the mass storage device 728, in the volatile memory 714, in the non-volatile memory 716, and/or on a removable tangible computer readable storage medium such as a CD or DVD.

From the foregoing, it will be appreciated that example methods, apparatus and articles of manufacture have been disclosed that generate masked images in stationary trackers before sending visual captures of tag bearers (e.g., displayable features) across a network (e.g., across the Internet to a cloud service). As a result, identities or privacies of non-displayable features are protected during transmission of the visual captures of the tag bearers. Thus, even if masked images are intercepted by third-parties during transmissions between the stationary trackers and the cloud service, the images of the non-displayable features are not discernible or visible to the third-parties from the masked images. In this manner, identities or privacies of non-displayable features are not inadvertently exposed to other networked devices or computers connected to the Internet that may maliciously or inadvertently access the masked images during transmission. In addition, generating masked images in distributed stationary trackers instead of at cloud service offloads processing requirements from the cloud service. For example, processing requirements for machine vision analyses and privacy mask generating processes are distributed to multiple stationary trackers so that each stationary trackers can use its processing capabilities for machine vision analyses of visual captures and generate masked images so that the cloud service need not be equipped with the significant additional CPU (central processing unit), GPU (graphic processing unit), and/or memory resources required to perform such machine vision analyses and privacy mask generating processes for a large number of visual captures received from a large number of networked cameras. In addition, machine vision analyses and privacy mask generating processes can be done faster when performed in parallel at distributed stationary trackers rather than performed in seriatim in a central location such as the cloud service.

The following pertain to further examples disclosed herein.

Example 1 is an apparatus to selectively generate a masked image. The apparatus of Example 1 includes a convolutional neural network detector to detect a first feature and a second feature in an image captured by a camera; a feature recognizer to determine the first feature is a displayable feature and the second feature is a non-displayable feature by comparing the first and second features of the image to reference feature images stored in a memory; and a blur generator to generate the masked image to display the displayable feature and mask the non-displayable feature.

In Example 2, the subject matter of Example 1 can optionally include an image output selector to: select the masked image when the feature recognizer detects the non-displayable feature; and select a raw image without masking when the feature recognizer does not detect a non-displayable feature corresponding to the raw image.

In Example 3, the subject matter of any one or more of Examples 1-2 can optionally include that the convolutional neural network detector is to determine location information and dimension information corresponding to the non-displayable feature, and the blur generator is to mask the non-displayable feature based on the location information and the dimension information.

In Example 4, the subject matter of any one or more of Examples 1-3 can optionally include that the displayable and non-displayable features are at least one of faces, objects, or vehicles.

In Example 5, the subject matter of any one or more of Examples 1-4 can optionally include a geographic location detector to provide geographic location coordinates of a geographic location corresponding to the first feature.

In Example 6, the subject matter of any one or more of Examples 1-5 can optionally include a geographic location comparator to determine the first feature is displayable based on the geographic location coordinates corresponding to the first feature matching reference geographic location coordinates corresponding to one of the reference feature images in the memory.

In Example 7, the subject matter of any one or more of Examples 1-6 can optionally include one or more processors in circuit with the memory; and a network interface in circuit with the one or more processors, the one or more processors to implement the convolutional neural network detector, the feature recognizer, and the blur generator.

In Example 8, the subject matter of any one or more of Examples 1-7 can optionally include that to mask the non-displayable feature is to at least one of blur, obscure, obfuscate, conceal, or hide the non-displayable feature.

In Example 9, the subject matter of any one or more of Examples 1-8 can optionally include that to mask the non-displayable feature is based on at least one of altering pixels of the image, replacing pixels of the image, or cropping the non-displayable feature from the image.

Example 10 is an apparatus to selectively generate a masked image. The apparatus of Example 10 includes feature detecting means for detecting a first feature and a second feature in an image captured by a camera; feature recognizing means for determining the first feature is a displayable feature and the second feature is a non-displayable feature by comparing the first and second features of the image to reference feature images stored in a memory; and mask generating means for generating the masked image to display the displayable feature and mask the non-displayable feature.

In Example 11, the subject matter of Example 10 can optionally include image output selecting means for: selecting the masked image when the feature recognizing means does detect the non-displayable feature; and selecting a raw image without masking when the feature recognizing means does not detect a non-displayable feature corresponding to the raw image.

In Example 12, the subject matter of any one or more of Examples 10-11 can optionally include that the mask generating means is to generate a privacy mask in the masked image based on location information and dimension information of the displayable feature, the displaying of the displayable feature and the masking of the non-displayable feature to be based on the privacy mask.

In Example 13, the subject matter of any one or more of Examples 10-12 can optionally include that the displayable and non-displayable features are at least one of faces, objects, or vehicles.

In Example 14, the subject matter of any one or more of Examples 10-13 can optionally include geographic locating means for providing geographic location coordinates of a geographic location corresponding to the first feature.

In Example 15, the subject matter of any one or more of Examples 10-14 can optionally include geographic location comparing means for determining the first feature is displayable based on the geographic location coordinates corresponding to the first feature matching reference geographic location coordinates corresponding to one of the reference feature images in the memory.

In Example 16, the subject matter of any one or more of Examples 10-15 can optionally include that to mask the non-displayable feature is to at least one of blur, obscure, obfuscate, conceal, or hide the non-displayable feature.

In Example 17, the subject matter of any one or more of Examples 10-16 can optionally include that to mask the non-displayable feature is based on at least one of altering pixels of the image, replacing pixels of the image, or cropping the non-displayable feature from the image.

In Example 18, the subject matter of any one or more of Examples 10-17 can optionally include one or more processors in circuit with the memory; and a network interface in circuit with the one or more processors, the one or more processors to implement the feature detecting means, the feature recognizing means, and the mask generating means.

Example 19 is a non-transitory computer readable storage medium including instructions that, when executed, cause one or more processors to at least: detect, via a convolutional neural network, a first feature and a second feature in an image captured by a camera; determine the first feature is a displayable feature and the second feature is a non-displayable feature by comparing the first and second features of the image to reference feature images stored in a memory; and generate a masked image to display the displayable feature and mask the non-displayable feature.

In Example 20, the subject matter of Example 19 can optionally include that the instructions are further to cause the one or more processors to: select the masked image based on the determining that the second feature is the non-displayable feature; and select a raw image without masking when a non-displayable feature is not detected in the raw image.

In Example 21, the subject matter of any one or more of Examples 19-20 can optionally include that the instructions are further to cause the one or more processors to: determine location information and dimension information corresponding to the displayable feature; and generate a privacy mask in the masked image based on the location information and the dimension information of the displayable feature, the masked image to be based on the privacy mask.

In Example 22, the subject matter of any one or more of Examples 19-21 can optionally include that the displayable and non-displayable features are at least one of faces, objects, or vehicles.

In Example 23, the subject matter of any one or more of Examples 19-22 can optionally include that the instructions are further to cause the one or more processors to provide geographic location coordinates of a geographic location corresponding to the first feature.

In Example 24, the subject matter of any one or more of Examples 19-23 can optionally include that the instructions are further to cause the one or more processors to determine the first feature is displayable based on the geographic location coordinates corresponding to the first feature matching reference geographic location coordinates corresponding to one of the reference feature images in the memory.

In Example 25, the subject matter of any one or more of Examples 19-24 can optionally include that to mask the non-displayable feature is to at least one of blur, obscure, obfuscate, conceal, or hide the non-displayable feature.

In Example 26, the subject matter of any one or more of Examples 19-25 can optionally include that to mask the non-displayable feature is based on at least one of altering pixels of the image, replacing pixels of the image, or cropping the non-displayable feature from the image.

Example 27 is a method to selectively generate a masked image. The method of Example 27 includes detecting, via a convolutional neural network, a first feature and a second feature in an image captured by a camera; determining, by executing an instruction with a processor, the first feature is a displayable feature and the second feature is a non-displayable feature by comparing the first and second features of the image to reference feature images stored in a memory; and generating, by executing an instruction with the processor, a masked image to display the displayable feature and mask the non-displayable feature.

In Example 28, the subject matter of Example 27 can optionally include selecting the masked image based on the detecting of the non-displayable feature; and selecting a raw image without masking when a non-displayable feature is not detected in the raw image.

In Example 29, the subject matter of any one or more of Examples 27-28 can optionally include determining location information and dimension information corresponding to the displayable feature; and generating a privacy mask in the masked image based on the location information and the dimension information of the displayable feature, the masked image to be based on the privacy mask.

In Example 30, the subject matter of any one or more of Examples 27-29 can optionally include that the displayable and non-displayable features are at least one of faces, objects, or vehicles.

In Example 31, the subject matter of any one or more of Examples 27-30 can optionally include providing geographic location coordinates of a geographic location corresponding to the first feature.

In Example 32, the subject matter of any one or more of Examples 27-31 can optionally include determining the first feature is displayable based on the geographic location coordinates corresponding to the first feature matching reference geographic location coordinates corresponding to one of the reference feature images in the memory.

In Example 33, the subject matter of any one or more of Examples 27-32 can optionally include that to mask the non-displayable feature is to at least one of blur, obscure, obfuscate, conceal, or hide the non-displayable feature.

In Example 34, the subject matter of any one or more of Examples 27-33 can optionally include that to mask the non-displayable feature is based on at least one of altering pixels of the image, replacing pixels of the image, or cropping the non-displayable feature from the image.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A stationary tracker comprising:
   memory to store fixed geographic location information indicative of a fixed geographic location of the stationary tracker, and to store a reference feature image, the reference feature image received from a cloud service; and
   at least one processor to:
     determine a feature in an image is a non-displayable feature by comparing the feature to the reference feature image; and
     generate a masked image, the masked image to mask the non-displayable feature based on the non-displayable feature not allowed to be displayed when captured from the fixed geographic location of the stationary tracker, and the masked image to display a displayable feature in the image.

2. The stationary tracker of claim 1, further including a first convolutional neural network to detect the non-displayable feature in the image.

3. The stationary tracker of claim 2, further including a second convolutional neural network to detect the displayable feature in the image.

4. The stationary tracker of claim 1, further including a camera to capture the image.

5. The stationary tracker of claim 1, wherein the feature in the image is at least one of: (a) a face of a person, or (b) a vehicle.

6. The stationary tracker of claim 1, further including a wireless interface to detect a wireless tag located on a tag bearer, the at least one processor to determine the tag bearer is the displayable feature in the image based on the wireless tag.

7. The stationary tracker of claim 1, further including a network interface to be in communication with the cloud service.

8. The stationary tracker of claim 7, wherein the at least one processor is to determine the feature in the image is the non-displayable feature based on an instruction from the cloud service.

9. A stationary tracker comprising:
   means for storing to:
     store geographic location information indicative of a fixed geographic location of the stationary tracker; and
     store a reference feature image;
   means for processing to, based on information from a cloud service:
     determine a feature in an image is a non-displayable feature based on: (a) a comparison of the feature to the reference feature image, and (b) the geographic location information, wherein the non-displayable feature is not allowed to be displayed when captured from the fixed geographic location of the stationary tracker; and generate a masked image, the masked image to mask the non-displayable feature, and the masked image to display a displayable feature in the image; and first means for generating a first probability value to detect the non-displayable feature in the image.

10. The stationary tracker of claim 9, further including second means for generating a second probability value to detect the displayable feature in the image.

11. The stationary tracker of claim 9, further including means for capturing the image.

12. The stationary tracker of claim 9, wherein the feature in the image is at least one of: (a) a face of a person, or (b) a vehicle.

13. The stationary tracker of claim 9, further including means for detecting a wireless tag located on a tag bearer, the means for processing to determine the tag bearer is the displayable feature in the image based on the wireless tag.

14. The stationary tracker of claim 9, wherein the information from the cloud service includes at least one of an instruction or the reference feature image.

15. A stationary tracker comprising:
memory to store fixed geographic location information indicative of a fixed geographic location of the stationary tracker, and to store a reference feature image; and
at least one processor to, based on information from a cloud service:
recognize a non-displayable feature in an image by comparing the non-displayable feature to the reference feature image;
determine a tag bearer in the image is a displayable feature based on a wireless tag located on the tag bearer; and
generate a masked image, the masked image to display the displayable feature based on the displayable feature being allowed to be displayed when captured from the fixed geographic location of the stationary tracker, and the masked image to mask the non-displayable feature in the image.

16. The stationary tracker of claim 15, further including a convolutional neural network to detect the non-displayable feature in the image before the at least one processor is to recognize the non-displayable feature.

17. The stationary tracker of claim 15, further including a camera to capture the image.

18. The stationary tracker of claim 15, wherein the non-displayable feature in the image is at least one of: (a) a face of a person, or (b) a vehicle.

19. The stationary tracker of claim 15, wherein the information from the cloud service includes at least one of an instruction or a tag identifier.

20. A non-transitory computer readable storage medium comprising computer readable instructions that, when executed, cause at least one processor to at least:
access an image captured by an image capture device of a stationary tracker, the stationary tracker located at a fixed geographic location;
recognize a non-displayable feature in the image by comparing the non-displayable feature to a reference feature image;
access an identifier of a wireless tag located on a tag bearer;

determine the tag bearer is a displayable feature in the image based on the identifier of the wireless tag; and
generate a masked image, the masked image to mask the non-displayable feature based on the non-displayable feature not allowed to be displayed when captured from the fixed geographic location, and the masked image to display the displayable feature in the image.

21. The non-transitory computer readable storage medium of claim 20, wherein the instructions are to cause the at least one processor to execute a first convolutional neural network to detect the non-displayable feature in the image.

22. The non-transitory computer readable storage medium of claim 21, wherein the instructions are to cause the at least one processor to execute a second convolutional neural network to detect the displayable feature in the image.

23. The non-transitory computer readable storage medium of claim 20, wherein the non-displayable feature in the image is at least one of: (a) a face of a person, or (b) a vehicle.

24. The non-transitory computer readable storage medium of claim 20, wherein the image capture device is a camera.

25. The non-transitory computer readable storage medium of claim 20, wherein the instructions are to cause the at least one processor to access the reference feature image in a database, the reference feature image from a cloud service.

26. A non-transitory computer readable storage medium comprising computer readable instructions that, when executed, cause at least one processor to at least:
access an image captured by an image capture device of a stationary tracker, the stationary tracker located at a fixed geographic location;
recognize a non-displayable feature in the image based on a cloud service by comparing the non-displayable feature to a reference feature image; and
generate a masked image based on the cloud service, the masked image to mask the non-displayable feature based on the non-displayable feature not allowed to be displayed when captured from the fixed geographic location, and the masked image to display a displayable feature in the image.

27. The non-transitory computer readable storage medium of claim 26, wherein the instructions are to cause the at least one processor to execute a first convolutional neural network to detect the non-displayable feature in the image.

28. The non-transitory computer readable storage medium of claim 26, wherein the instructions are to cause the at least one processor to execute a second convolutional neural network to detect the displayable feature in the image.

29. The non-transitory computer readable storage medium of claim 26, wherein the non-displayable feature in the image is at least one of: (a) a face of a person, or (b) a vehicle.

30. The non-transitory computer readable storage medium of claim 26, wherein the instructions are to cause the at least one processor to:
detect a wireless tag located on a tag bearer; and
determine the tag bearer is the displayable feature in the image based on the wireless tag.

31. The non-transitory computer readable storage medium of claim 26, wherein the instructions are to cause the at least one processor to access the reference feature image in a database, the reference feature image from the cloud service.

32. A method comprising:
accessing an image captured by an image capture device of a stationary tracker, the stationary tracker located at a fixed geographic location;

recognizing a non-displayable feature in the image based on a cloud service by comparing the non-displayable feature to a reference feature image; and generating a masked image based on the cloud service, the masked image to mask the non-displayable feature based on the non-displayable feature not allowed to be displayed when captured from the fixed geographic location, and the masked image to display a displayable feature in the image.

33. The method of claim 32, further including executing a first convolutional neural network to detect the non-displayable feature in the image.

34. The method of claim 32, further including executing a second convolutional neural network to detect the displayable feature in the image.

35. The method of claim 32, wherein the non-displayable feature in the image is at least one of: (a) a face of a person, or (b) a vehicle.

36. The method of claim 32, further including:
detecting a wireless tag located on a tag bearer; and
determining the tag bearer is the displayable feature in the image based on the wireless tag.

37. The method of claim 32, further including accessing the reference feature image in a database, the reference feature image from the cloud service.

* * * * *